United States Patent [19]

van den Driessche

[11] 4,345,246
[45] Aug. 17, 1982

[54] SYNCHRONIZATION DEVICE FOR A CHARACTER-GENERATING CIRCUIT AND A VERTICAL SCANNING CIRCUIT AND TELEVISION RECEIVER COMPRISING SUCH A DEVICE

[75] Inventor: Michel van den Driessche, Paris, France

[73] Assignee: Thomson-CSF, Paris, France

[21] Appl. No.: 160,453

[22] Filed: Jun. 18, 1980

[30] Foreign Application Priority Data

Jun. 20, 1979 [FR] France ............................... 79 15804

[51] Int. Cl.³ .......................... G09G 1/16; H04N 5/22
[52] U.S. Cl. .................................. 340/748; 340/814; 358/183
[58] Field of Search ............... 358/142, 147, 148, 183; 340/723, 724, 726, 748, 750, 814

Primary Examiner—John C. Martin
Attorney, Agent, or Firm—Cushman, Darby & Cushman

[57] ABSTRACT

Devices for displaying a label on a visualization screen. The information display inserted into a background image is provided by a character-generating circuit. The stability of the label requires synchronization of the vertical scanning of the image and of the label. This synchronization is obtained by measuring the current which flows through the deflector of the cathoscope tube: the information acquired, amplified, is applied to a threshold detector which controls the display circuit. The beginning and the end of synchronization are regulated by two reference voltages. The invention applies to the display of information on television receiver or visualization console screens.

4 Claims, 5 Drawing Figures

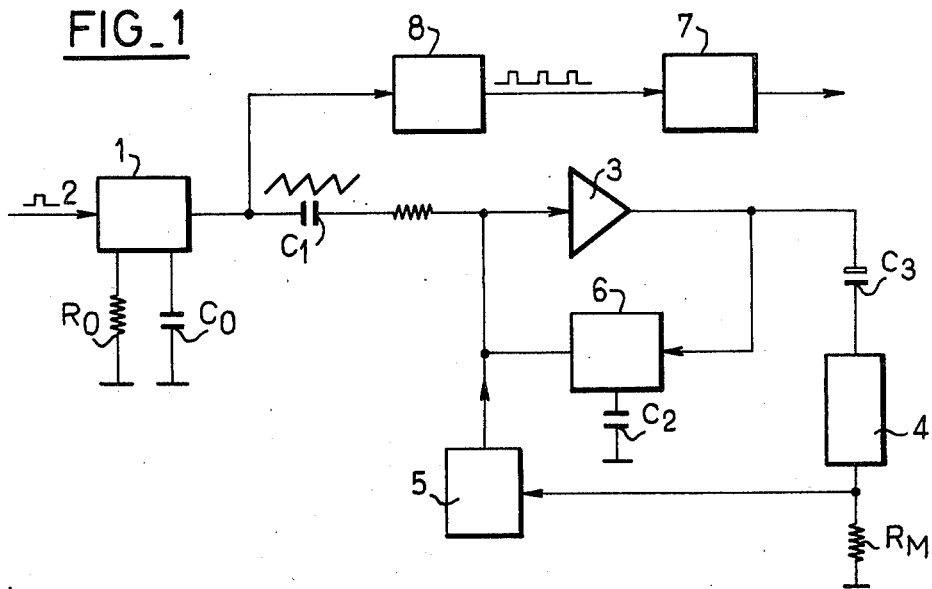
FIG_1
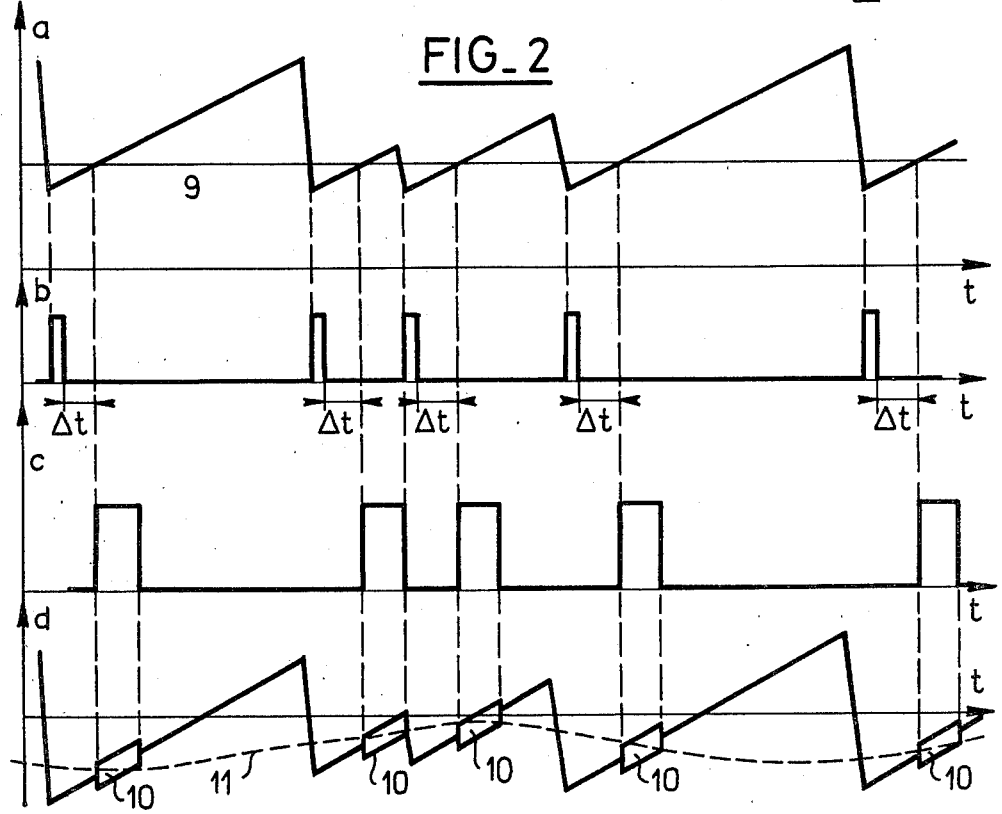
FIG_2

FIG_3
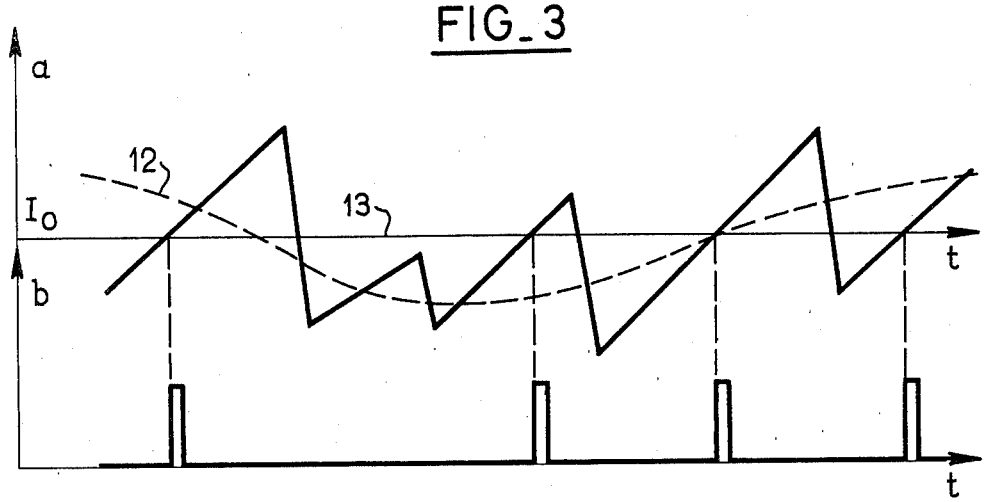
FIG_4
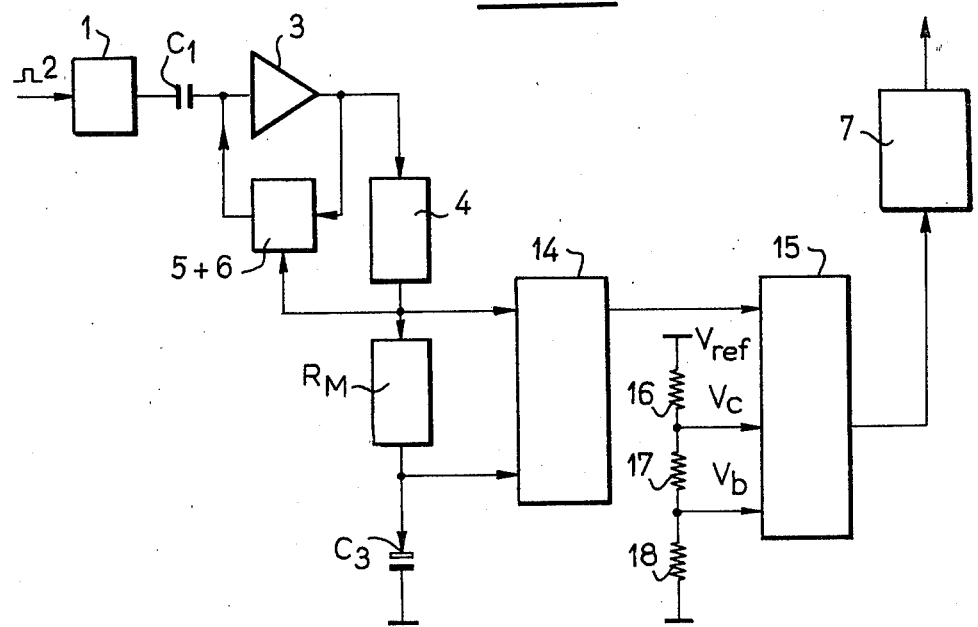

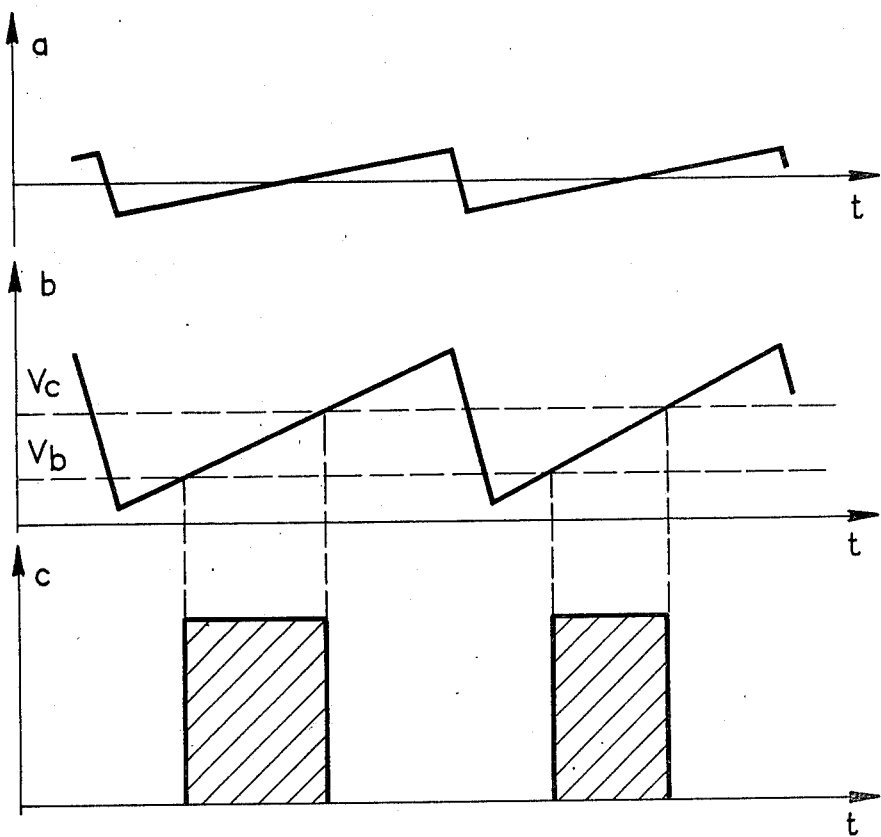
FIG_5

SYNCHRONIZATION DEVICE FOR A CHARACTER-GENERATING CIRCUIT AND A VERTICAL SCANNING CIRCUIT AND TELEVISION RECEIVER COMPRISING SUCH A DEVICE

BACKGROUND OF THE INVENTION

The present invention relates to the field of television and tele-display, more particularly that of display, on a viewing screen or cathoscope, of an added "label" inserted locally into an image. More precisely, the invention relates to the synchronization of the label with the vertical and horizontal scanning of the screen.

It frequently happens that complementary information is added to viewing screen. This information may for example—and without the cases cited being limiting—be the display of the selected channel or the time on a domestic television reception screen, or the display of parameters on a graphic tele-data processing console.

The legibility of the labels implies a good stability thereof with respect to the image, i.e. good synchronization of the scan generating the image and of the scan generating and label: it is a solution in this problem of synchronization which the device of the invention provides.

To obtain the stability of the labels, the device of the invention links the triggering of the display to a current in the coil of the deflector of the cathoscope tube.

SUMMARY OF THE INVENTION

More precisely, the invention consists of a device for synchronizing a character-generating circuit and a vertical scanning circuit, in a visualization tube, the scanning circuit having particularly a deflector coil, wherein the control signal for the generating circuit is made dependent on the current flowing through the deflector via a threshold detector, a first measuring input of which receives a voltage proportional to the current through the deflector and a second reference input receives a reference voltage, the threshold detector changing state when the voltage measured reaches the reference voltage, the output signal of the threshold detector forming the synchronization signal for the generating circuit.

The invention will be better understood from the following description of application, which refers to the figures.

DESCRIPTION OF THE DRAWINGS

FIG. 1 shows a synchronization device of the prior art.

FIG. 2 shows operating diagrams for the device of FIG. 1.

FIG. 3 shows triggering diagrams for the device of the invention.

FIG. 4 is an electrical diagram of the device of the invention.

FIG. 5 shows operating diagrams for the device of the invention.

DESCRIPTION OF THE PREFERRED EMBODIMENT

FIG. 1 shows a scanning synchronization device of the prior art.

An oscillator 1, whose frequency is controlled by a resistance $R_o$ and a capacitor $C_o$, receives at one input 2 the frame sychronizing pulses which are generally to be found in a television set. This oscillator delivers at its output a saw-tooth voltage, which is applied, through a connecting capacitor $C_1$ to a power amplifier 3. The output current of amplifier 3 flows through the deflecting block 4 of the cathoscope tube, through a connecting capacitor $C_3$. $R_M$ is a resistor in series with the deflector 4: it allows the current flowing the deflector to be measured and to be made dependent on the current feedback 5. The conventional vertical scanning diagram in television is completed by a voltage feedback 6, which comprises an integrating capacitor $C_2$ for eliminating the alternating component.

When the television receiver or visualization console are designed to display a label in a background image, a circuit 7, generating texts or sets of initials, is added to this conventional diagram: this circuit is synchronized in vertical scanning by a pulse-generating circuit 8. This latter, connected to the output of oscillator 1, provides brief pulses synchronized with the frame return, i.e., to the steep trailing edge of the saw-teeth.

Thus; in know devices, the information transmitted to the digital systems which generate the video characters is supposed to correspond to a position of the vertical scanning corresponding to the part of the screen on which the display of the label is to be triggered off. In fact, this information is taken from the control voltage of the power amplifier 3, and more precisely from the trailing edge of the saw-teeth; now, there may be distortion between the control voltage and the current which actually flows through deflector 4.

In fact, in the absence of a broadcast received on the television receiving antenna, or more generally in the absence of an input signal to the visualization console, the gain of the high-frequency and intermediate-frequency amplification stages is at a maximum because of the automatic gain control, and the signal present at the synchronization input 2 of the vertical scanning oscillator 1 is greatly disturbed. In this case, the output saw-tooth of the oscillator is of a variable periodicity.

The different time constants created by the three capacitors $C_1$ $C_2$ and $C_3$ modify the average value of the current in the deflector depending on the periodicity variations of the saw-tooth of the oscillator: to a control pulse of display circuit 7 will correspond a current which may be different between two consecutive frames in the deflector, which causes instability of the label displayed on the screen.

It is then no good using the saw-teeth of the oscillator on the vertical scanning return to synchronize the display device. Between these control signals and the deflector are interposed an amplifier assembly, feedback and capacitor whose transfer equation varies with the period of the saw-teeth, and the display is unstable.

The diagrams of FIG. 2 illustrate the phenomena which have just been described.

All these diagrams have the same time scale shown as abscissa.

Diagram 2a shows the saw-tooth voltage at the output of oscillator 1, in the case precisely where interference disturbs the oscillator, and the saw-teeth do not all have the same width—which leads furthermore to them all not having the same amplitude, since the slope in the same. The display-triggering threshold occurs when the saw-tooth signal reaches level 9.

Diagram 2b shows the pulses produced at the output of generator 8. These pulses are synchronized with the trailing edge of the saw-teeth, i.e. to the frame return.

Diagram 2c shows the display periods which correspond to squarewave pulses used in the character generator 7, by means which are outside the scope of the invention. It should only be noted that all these squarewave display pulses have a leading edge synchronized with respect to the pulses produced by generator 8, and shifted by a constant time $\Delta t$.

Diagram 2d shows the current in deflector 4. The average value 11 of the display current varies because of the periodicity variations of the oscillator; for this reason, the current which flow through the deflector during the display period is never the same.

The scanning synchronization device of the invention is based on the triggering of the display being no longer conncted with the return of the scan but to the current which flows through the deflector.

The difference is very important. The signals corresponding to the return time have no direct relationship with the current in the deflector when periodicity changes occur due to the nose on the synchronization signal. In the device of the invention, the scanning synchronization is triggered off by the current in the deflector—i.e. by a real state—when this current reaches a predetermined threshold. If interference occurs, the worst case is that where this threshold is not reached: the display of the label would not be triggered off. Beyond this case, whatever the external interference, the display is synchronized with the current level in the deflector, so with the height of the screen: it is perfectly stable.

The diagrams of FIG. 3 illustrate this mode of operation. They both have the same time scale shown as abscissa.

Diagram 3c shows the current which flows through the deflector: the control oscillator is assumed to be subjected to interference, and the average value of the current in the coil of the deflector is shown by an uneven line 12. The invention uses a device which triggers the synchronization pulse each time that the current in the deflector reaches a specific value $I_o$. The points on the current saw-tooth which all represent the same value $I_o$ are aligned along a straight line 13.

The invention uses a flip-flow which changes state each time that threshold $I_o$ is reached.

Diagram 3b shows the synchronization pulses emitted by this threshold detector.

Since the position of the electron beam on the visualization screen is directly proportional to the current flowing through the deflector, the display of a label on the screen is stable, since it is controlled by the current, even in the case where the vertical scanning is disturbed.

Cases may occur where the disturbance of the vertical scanning is such that a saw-tooth does not reach the current threshold $I_o$: this is what is shown intentionally on the second saw-tooth of FIG. 3. In actual fact, this case does not cause serious consequences. Since threshold $I_o$ is not reached, there is no synchronization pulse and the label is not displayed for the space of a frame, i.e. for 20 milliseconds: the human eye is not sensitive, and integrates the images seen during the preceding frames and the following frames.

FIG. 4 shows the electrical diagram of the synchronization device of the invention.

This diagram comprises a conventional part, very much simplified because it is outside the scope of the invention, formed on an oscillator 1 controlled by a synchronization pulse 2, a power amplifier 3, a deflector coil 4 and current and voltage feedbacks 5 and 6. The circuit is looped to ground through a measuring resistance $R_M$ and a connecting capacitor $C_3$ which may also be placed between amplifier 3 and deflector 4.

At the terminals of measuring resistance $R_M$ there is developed a very low voltage, of the order of 0.5 to 1 volt peak-to-peak, proportional to the current in the deflector. This voltage is amplified by a voltage amplifier 14, connected to the two terminals of measuring resistance $R_M$.

The output signal of voltage amplifier 14 is applied to one of the input terminals of a threshold detector 15, the so-called measuring input. The reference voltages $V_b$ and $V_c$ of the threshold detector determine the triggering of the output pulse.

It is important to note—and that will be shown subsequently with reference to FIG. 5—that threshold detector 15 operates in fact between two thresholds: the first threshold, at voltage $V_b$, triggers the scanning of the display, as was mentioned with reference to FIG. 3a; the second threshold at voltage $V_c$, ends the display. The two thresholds $V_b$ and $V_c$ are then adjustable, according to the desired position of the display on the screen, since the height of a label on the screen depends on the current in the deflector, and consequently on the reference voltages $V_b$ and $V_c$ which cause flip-flop 15 to trip when the corresponding current in the deflector is reached.

The output signals of threshold detector 15 are applied to one of the input terminals of a character-generating circuit 7, identical to the one which, in the prior art shown in FIG. 1, is controlled by the control signals from oscillator 1. The character generator is then synchronized with the actual current in the deflector.

FIG. 5 illustrates the operation of threshold detector 15. Like the preceding diagrams, those of FIG. 5 have the same time scale shown in abscissa.

Diagram 5a shows the voltage at the terminals of measuring resistance $R_M$: it is then that which is applied to the input of amplifier 14, and it is a saw-tooth with a value from 0.5 to 1 volt approximately peak-to-peak, without that being in any wise limiting.

Diagram 5b shows the voltage at the output of amplifier 14: it reproduces faithfully the input voltage, amplified. The different reference voltages $V_b$ and $V_c$ are shown in this diagram by two straight lines parallel to the time axis. When the output voltage of amplifier 14 reaches the reference voltage $V_b$, threshold detector 15 trips a first time and delivers at its output terminal a synchronization signal which controls display circuit 7. This state lasts until the output voltage of amplifier 14 has reached reference voltage $V_c$, which causes threshold detector 15 to trip a second time and ends the display.

Diagram 5c shows the square-wave synchronization pulses coming from the threshold detector and applied to display circuit 7. It is remarkable that, even though, for any reason whatsoever, the period of the saw-teeth varies, and so the average value changes, the display remains stable since the beginning and the end of the synchronization, i.e. the height of the label on the screen, are dependent on the current in the deflector, itself dependent on the deflection of the electron beam on the screen.

What is claimed is:

1. A synchronization device for a character-generating circuit and a vertical scanning circuit of an image tube, the scanning circuit comprising a deflector coil and a threshold detector, wherein the synchronization control signal for the generating circuit is made dependent on the current flowing through the deflector via the threshold detector a first measuring input of which receives a voltage proportional to the current through the deflector and a second reference input receives a reference voltage, the threshold detector changing state when the voltage measured reaches the reference voltage, the output signal of the threshold detector forming the synchronization signal for the generating circuit.

2. The synchronization device as claimed in claim 1, wherein the voltage representative of the current flowing through the deflector is measured at the terminals of a measuring resistance in series with the deflector and amplified by a voltage amplifier.

3. The synchronization device as claimed in claim 1, wherein the threshold detector receives at its reference inputs two reference voltages, the first of these corresponding to a first current threshold in the deflector and to a first state of the threshold detector, fixing the beginning of the synchronized scanning; and the second reference voltage corresponding to a second current threshold in the deflector and to a second state of the threshold detector, fixing the end of the synchronized scanning.

4. The synchronization device as claimed in claims 1 or 3, wherein the position of the display on the image tube is fixed by the current flowing through the deflector and independent of the frequency of the vertical scanning.

* * * * *